M. H. SMITH.
CAPSULE.
APPLICATION FILED MAY 27, 1913.

1,087,843.

Patented Feb. 17, 1914.

WITNESSES

INVENTOR
Martin H. Smith
BY
ATTORNEYS

UNITED STATES PATENT OFFICE.

MARTIN H. SMITH, OF NEW YORK, N. Y.

CAPSULE.

1,087,843.

Specification of Letters Patent.

Patented Feb. 17, 1914.

Application filed May 27, 1913. Serial No. 770,200.

*To all whom it may concern:*

Be it known that I, MARTIN H. SMITH, a citizen of the United States, and a resident of the city of New York, borough of Manhattan, in the county and State of New York, have invented a new and Improved Capsule, of which the following is a full, clear, and exact description.

The invention relates to medicines, and its object is to provide a new and improved capsule designed for containing medicinal oils, medicinal oil mixtures and other medicines, and arranged to enable the manufacturer to provide the capsule with a practically non-discernible identification mark, to prevent substitution of spurious goods without detection, and to enable a physician to detect whether the goods are genuine or not, while the identification mark is not apparent to the layman, and hence the latter has not the opportunity of detecting what is being prescribed by the physician, thereby not enabling the layman to obtain the medicine otherwise.

In order to accomplish the desired result, a capsule of a gelatinous material is provided at its inner face with a raised identification mark of the same material as the capsule and integral therewith, the capsule being filled with a liquid medicine having approximately the same index of refraction as the capsule so that the identification mark is not discernible from the outside.

A practical embodiment of the invention is represented in the accompanying drawings forming a part of this specification, in which similar characters of reference indicate corresponding parts in all the views.

Figure 1:
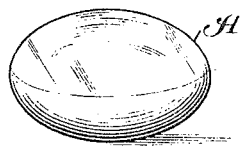
Figure 2:
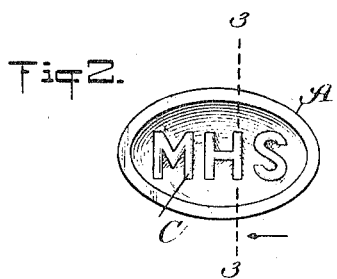
Figure 3:
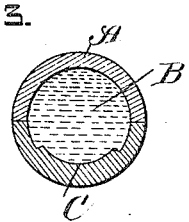

Figure 1 is a side elevation of the filled capsule provided with an unobservable identification mark; Fig. 2 is an inner face view of one-half of a capsule provided with the identification mark; and Fig. 3 is a cross section of the filled capsule on the line 3—3 of Fig. 2.

Capsules of gelatinous or other diaphanous (transparent or translucent) materials have heretofore been provided with identification marks which are printed on the inner surface of the capsule prior to filling the same with the desired medicine, but such identification marks are visible after the capsule is filled and closed and hence the identity of the capsule is established. This visible identification mark has drawbacks, notably that the layman can indiscriminately order the goods without the aid of the physician and for this reason it is a disadvantage to restrict the physician to a capsule without any identification mark and thereby allowing druggists to furnish capsules containing spurious medicines without detection. In order to avoid this the capsule is provided with an identification mark which is not apparaent to the layman, but the physician on opening a capsule and emptying the same of its contents can readily discern the identification mark and be thus assured of the genuineness of the goods. In order to accomplish the desired result the following arrangement is made: In the manufacture of the article, the gelatinous or other diaphanous mass is spread in the form of a sheet on a metallic or other plate provided with the identification marks sunk in the face of the plate, so that the gelatinous mass passes into the sunken identification marks, and when the sheet is removed it is provided with raised identification marks of the same material as the sheet and integral therewith. The gelatinous sheets are next used in molds and compressing machines for forming the capsules and filling the same with the desired medicine in the usual manner, each filled capsule having at its inner face the identification mark in raised characters, which latter may be letters, numerals, signs, emblems, trademarks or the like denoting origin.

As shown in the drawings, the capsule A is filled with a medicine B, and the inner face of the capsule is provided at one of its halves with a raised identification mark C in the form of the letters "M. H. S." The medicine B is in the form of a medicinal oil or medicinal oil mixture or other medicine having an index of refraction corresponding approximately to that of the diaphanous mass of which the capsule is made, so that the identification mark of the filled capsule is not visible from the outside. The diaphanous mass of which the capsule and the identification mark are made is of a color to suit the color of the medicine filled into the capsule, so that the above described result is obtained, that is, the filled capsule is provided with an unobservable identification mark.

In practice it is sufficient to provide one of the shell halves of the capsule with the identification mark while the other half is left plain, but each half shell of the capsule may be provided with the identification mark.

It is understood that in some medicines filled into a capsule the liquid-carrying medium has all or some of the ingredients of the medicine in solid form and held in suspension in the carrying medium, such, for instance, as castor oil, ergotin and aloin. It is understood, however, that in this case the castor oil is the carrying medium and it has the same index of refraction as the capsule material. Other medicines, medicinal oils or medicinal oil mixtures, such, for instance, as castor oil, olive oil, oil of santol and the like appear as a clear liquid, of which, however, the index of refraction must correspond to that of the capsule material.

Having thus described my invention, I claim as new and desire to secure by Letters Patent:

1. As an article of manufacture, a capsule having a raised identification mark on the inner surface.

2. As an article of manufacture, a capsule of a diaphanous material and provided at its inner face with a raised identification mark.

3. As an article of manufacture, a capsule of a diaphanous material filled with a liquid medicine and provided at its inner face with a raised identification mark of the same diaphanous material as the capsule and integral therewith.

4. As an article of manufacture, a capsule of a diaphanous material filled with a liquid medicine and provided at its inner face with a raised identification mark of the same diaphanous material as the capsule and integral therewith, the said capsule and the liquid medicine having approximately the same index of refraction.

5. As an article of manufacture, a capsule filled with a liquid medicine, the capsule being provided at its inner surface with an integral identification mark, the said capsule being of a diaphanous material, and the liquid-carrying medium of the said medicine and the said diaphanous material having approximately the same index of refraction to render the said identification mark particularly undiscernible from the outside.

In testimony whereof I have signed my name to this specification in the presence of two subscribing witnesses.

MARTIN H. SMITH.

Witnesses:
 THEO. G. HOSTER,
 G. H. EMSLIE.